L. V. CLAIRE.
HOSE COUPLING.
APPLICATION FILED FEB. 24, 1920.

1,356,126.

Patented Oct. 19, 1920.
2 SHEETS—SHEET 1.

Inventor
Louis Vincent Claire
By Frank E. Liriance Jr.
Attorney

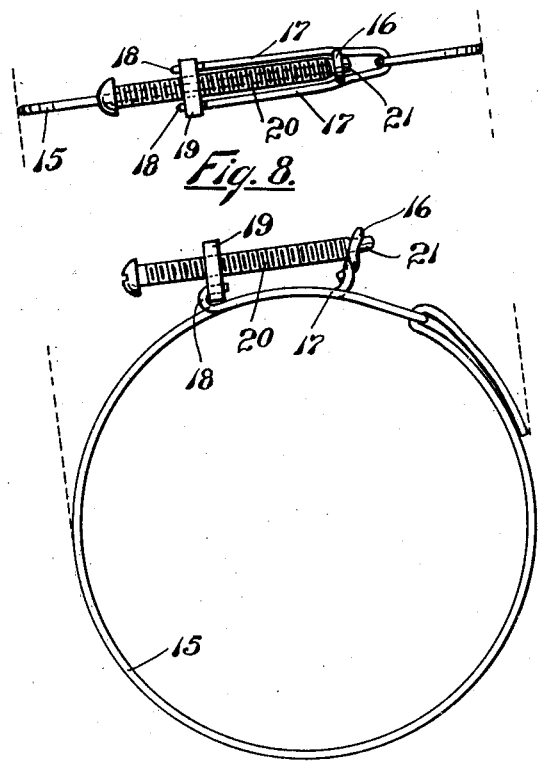
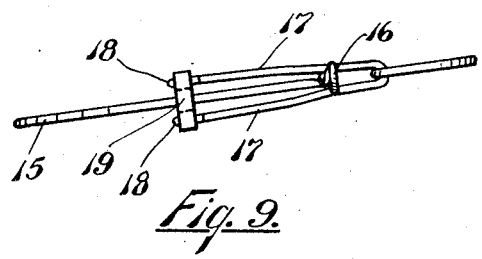

UNITED STATES PATENT OFFICE.

LOUIS VINCENT CLAIRE, OF GRAND RAPIDS, MICHIGAN, ASSIGNOR OF ONE-THIRD TO MICHAEL A. WOHLSCHEID, OF GRAND RAPIDS, MICHIGAN, AND ONE-THIRD TO NICHOLAS WOHLSCHEID, OF WESTPHALIA, MICHIGAN.

HOSE-COUPLING.

1,356,126.  Specification of Letters Patent.  Patented Oct. 19, 1920.

Application filed February 24, 1920. Serial No. 361,026.

*To all whom it may concern:*

Be it known that I, LOUIS VINCENT CLAIRE, a citizen of the United States of America, residing at Grand Rapids, in the county of Kent and State of Michigan, have invented certain new and useful Improvements in Hose-Couplings; and I do hereby declare the following to be a full, clear, and exact description of the invention, such as will enable others skilled in the art to which it appertains to make and use the same.

This invention relates to a hose coupling and is particularly concerned with a novel construction of coupling which may be applied to any and all sizes of hose between two limits, one the largest size which the coupling will take and the other the smallest size to which the coupling may be fitted. A further object of the invention is to construct a hose coupling entirely of wire, said hose coupling being adapted for application to any and all sizes of hose between two limits of size. A still further object of the invention is to construct a hose coupling of two parts connected together in such manner that the coupling may be approximately fitted to a hose at one connection and thereafter drawn tight against the hose at the other connection of said parts. Various other objects and purposes than those particularly stated will appear fully and in detail as understanding of the invention is had from the following description taken in connection with the accompanying drawing, in which;

Fig. 2 is a plan view thereof.

Fig. 7 is a side elevation of a still further modification in construction of hose coupling.

Fig. 8 is a plan thereof, and

Fig. 9 is an under plan view of the coupling shown in Fig. 7.

Like reference characters refer to like parts in the different views of the drawing.

Figures 1, 3, 4:
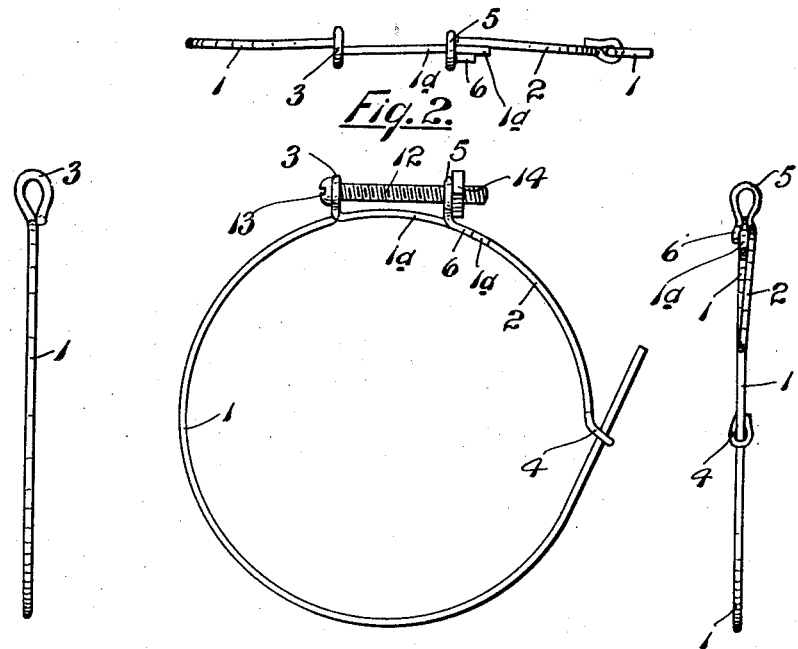
Figure 1 is a side elevation of a hose coupling made of wire in accordance with my invention.
Figs. 3 and 4 are respectively, views looking at opposed sides of the construction shown in Fig. 1.

In the modification shown in Fig. 1 the coupling is made of two curved sections of wire 1 and 2 the former of which is of relatively great length compared to the length of the latter. In the length of the section 1 a loop 3 is formed, the same projecting outwardly from the section and the wire section is extended a distance beyond the loop as indicated at 1ª. The other section 2 at one end is formed with a return bend 4 which makes a small loop through which one end of the section 1 passes freely. The opposite end of section 2 is formed into a loop 5 similar to loop 3 and projecting outwardly in the same direction. The wire which forms the loop 5 is turned back for a short distance, as indicated at 6, and spaced approximately a distance equal to the diameter of the wire used from the main portion of the section 2 whereby the end of the part 1ª of section 1 may pass between and be held and guided by the section 2 and said part 6 as best indicated in Fig. 2.

Figures 5, 6:
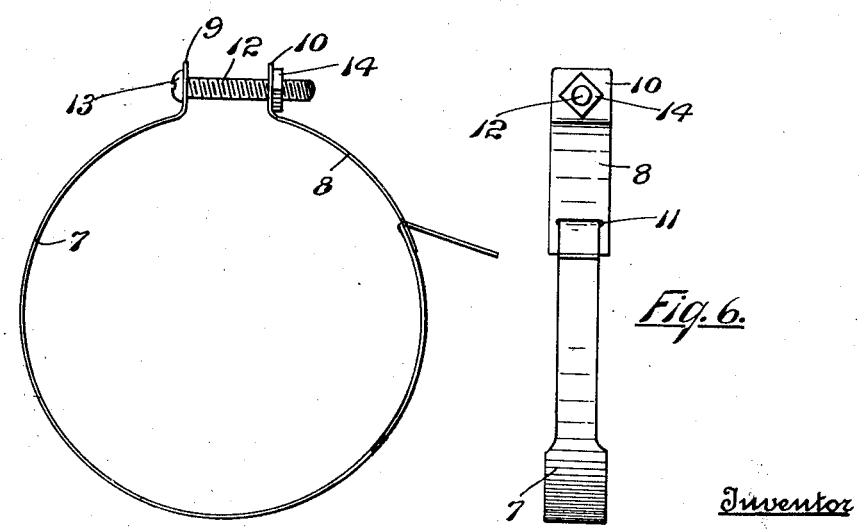
Fig. 5 is a view similar to Fig. 1 of a modification in structure in which the coupling is made of metal band material.
Fig. 6 is a side elevation thereof.

Another modification of the invention is shown in Figs. 5 and 6 in which the two sections 7 and 8 making up the coupling are of sheet metal in the form of bands. One end of each of said sections 7 and 8 is turned outwardly making ears 9 and 10. The opposite end of the section 7 is reduced somewhat in width and passes through a slot 11 near the opposite end of the section 8.

In both modifications a stove bolt 12 having a head 13 is used, the same passing through the loops 3 and 5 of the construction shown in Figs. 1 to 4 inclusive, and through the ears 9 and 10 in the construction shown in Figs. 5 and 6. A nut 14 is screwed onto the free end of the bolt and by tightening the same the loops 3 and 5 or the ears 9 and 10 may be drawn toward each other.

In use the coupling shown in Fig. 1 is placed around the hose where it is to be attached to any suitable inner member such as a neck projecting from the front end of an internal combustion engine or extending back from a radiator in a motor vehicle, the bolt 12 being in place and the parting of the coupling to permit the same to be placed around the hose being made where the end of section 1 goes through the loop 4. If the construction shown in Figs. 5 and 6 is used the action is the same except that the end of section 7 passes through the slot 11. The coupling is then drawn against the hose as tight as may be and the projecting end of either section 1 or section 7 bent back upon itself. Any excess of wire or of the band 7 may be cut off if desired. The coupling is then tightened by turning the nut on bolt 12 in the usual manner to thereby tighten the hose and make a water tight connection.

In Figs. 7, 8 and 9 a still further modification of the invention is shown. The longer section 15 of the coupling is of wire and is formed at one end with a loop 16 as shown. The other section of the coupling is also of wire and formed into substantially U-shape, the sides or legs 17 thereof being turned back upon themselves at their free ends, as indicated at 18, and passed through suitable openings made in the lower portions of a nut 19. A screw 20 threads through the nut 19 and is formed with a reduced end 21 to enter the loop 16.

With this coupling, the same as with those previously described, an approximate fitting of the coupling to the hose is obtained by inserting the end of section 15 through the U-shaped member and bending the wire back upon itself as shown in Fig. 7 after the coupling has been drawn as close as may be against the hose. Thereafter the screw 20 is operated so as to move nut 19 and loop 16 away from each other and thereby bring the coupling very tightly against the hose to make a water tight connection.

With couplings made in accordance with my invention only one size needs to be made to use with many different sizes of hose. The construction is very simple in application and economical in manufacture. With the construction shown in Figs. 1 to 4 inclusive and Figs. 7 to 9 inclusive there can be no pinching of the hose either between the loops 5 and 13 or between the loop 16 and the nut 19 and this is particularly true of the modification shown in Figs. 7 to 9 inclusive. Various other modifications in structural detail may be resorted to without departing from the invention and I consider myself entitled to all such modifications of structure as fall within the scope of the appended claims defining the invention.

I claim:

1. A hose coupling comprising two sections of bendable material, one of said sections being formed with means at one end to permit the entrance of one end of the other section and free passage thereof, means projecting outwardly from said sections adjacent their opposite ends and having openings therethrough, and means passing through the openings in said outwardly projecting means and adapted to be operated to tighten the coupling against a hose, substantially as described.

2. A hose coupling comprised of a wire section formed at one end with an out-turned loop, a second section of substantially U-shape through which the opposite end of the first section may pass, a nut attached at the ends of the sides of the said U-shaped section and a screw threaded through the nut and entering at its end into the loop on the first section, substantially as described.

3. A hose coupling comprising a wire section provided at one end with an out-turned loop, a second section also formed of wire through one end of which the opposite end of the first section is adapted to pass, the opposite end of the second section being provided with an outwardly projecting nut, and a screw threaded through the nut and engaging at one end with the loop on the first section to thereby change the size of the coupling on operation of the screw, substantially as described.

4. A hose coupling comprising a wire section of U-shaped form, a nut attached at the ends of the sides of said section and projecting outwardly therefrom, a second wire section located between the sides of the first section and extending beyond the same being formed to pass through between the sides of the first section at the bend therein, said second section being formed with an out-turned loop at one end which projects outwardly from between the sides of the first section, and means passing through the nut and engaging with said loop for increasing or decreasing the size of the coupling on operation of said means in opposite direction, substantially as described.

5. A hose coupling comprised of a section formed at one end with an out-turned part, a second section through which the opposite end of the first section may pass, the second section also having a part of the first section adjacent its out-turned part passing therethrough whereby said out-turned part lies above the second section, a nut associated with one end of the second section, and a screw threaded through the nut and against the said out-turned part of the first section, said part being provided with an opening to receive a reduced end of the screw, substantially as described.

In testimony whereof I affix my signature.

LOUIS VINCENT CLAIRE.